June 20, 1967 W. E. PROEBSTER 3,327,295

MAGNETIC TRANSFER CIRCUIT

Filed March 7, 1960 5 Sheets-Sheet 1

INVENTOR
WALTER E. PROEBSTER

BY [signature]
ATTORNEY

June 20, 1967 W. E. PROEBSTER 3,327,295

MAGNETIC TRANSFER CIRCUIT

Filed March 7, 1960 5 Sheets-Sheet 4

United States Patent Office 3,327,295
Patented June 20, 1967

3,327,295
MAGNETIC TRANSFER CIRCUIT

Walter E. Proebster, Ruschlikon, Zurich, Switzerland, assignor to International Business Machines Corporation, New York, N.Y., a corporation of New York Filed Mar. 7, 1960, Ser. No. 12,987
Claims priority, application Switzerland, Mar. 6, 1959, 70,474/59
14 Claims. (Cl. 340—174)

This invention relates to switching circuits and more particularly to magnetic transfer circuits wherein the basic element employed is a magnetic element capable of assuming different stable states of residual magnetization and of being switched from one to another of the different stable states by rotational processes.

Generally, magnetic material may be considered as containing a multiplicity of small magnetically saturated regions which are called domains. In demagnetized materials these domains are randomly positioned such that the resultant magnetization of the specimen is zero. Changes in the magnetization may be accomplished by rotation of the domains and by domain wall motion. In rotation, a magnetic moment, which is representative of a domain within the material, rotates similar to a compass needle in a given plane. This type of rotational mechanism provides very high switching speeds when switching from one to another stable magnetic state. Domain wall switching, on the other hand, is generally a slower process in which changes in the magnetization occur by the growth of domains oriented parallel to the applied field at the expense of domains oriented anti-parallel with the applied field.

Certain materials exhibit the characteristic of uni-axial anisotropy wherein the magnetic moments in the material tend to line up in either one or an opposite sense along an easy direction of magnetization. This characteristic may be produced in thin films of magnetic material and the different directions along the easy direction of magnetization may be designated as a 1 or a 0 in representing binary information.

While the direction along which the moments of an element having the characteristics defined above is said to be the "easy direction," analogously, a displacement of 90° from this direction is termed the "hard" direction. Thus an element having an easy direction of magnetization is said to have its moments rotated toward the "hard" direction upon application of a field transverse to the easy direction of the element. Upon termination of the applied transverse field, the moments return to their original direction along the easy direction of the element. To cause complete switching of such an element from one stable direction to another, a transverse field and a field anti-parallel to the direction of magnetization in which the element resides is applied. Thus a parallel and transverse field of predetermined magnitude applied to the easy direction of an element is said to cause rotational switching of the element from one stable magnetic state to another.

While elements having the characteristics defined above have been readily recognized as having static magnetic storage capabilities and of achieving very high speeds of operation, difficulty has heretofore been experienced in employing such elements in transfer circuits wherein one such element is utilized to convey its binary state to another similar element. Since elements made of thin magnetic films have very small material thickness, the output signal obtained is small, too small in many instances to provide a field to the succeeding element, i.e. either a parallel or transverse field, of sufficient magnitude to help switch the succeeding element from one to another of its stable magnetic states.

The aforementioned difficulties are surmounted by construction of a transfer circuit in accordance with this invention wherein a first and second magnetic element is provided having an easy direction of magnetization. Each of the elements is provided with an input, an output and a pre-orientation winding. The input winding of each element is wound in quadrature to the easy direction of the element and is thereby adapted to apply a field parallel to the easy direction when energized, while the output winding of each element is similarly wound, and the output winding of the first element is connected to the input winding of the second element. The pre-orientation winding of each element is wound in quadrature to the input winding and is adapted, when energized, to apply a transverse field to the easy direction of the element which rotates the moments of the element toward the "hard" direction.

By sequentially energizing the pre-orientation winding of each element the magnetic moments of each element are rotated toward the hard direction. Assuming the first element has its pre-orientation winding energized first, the transverse field applied rotates its moments toward the hard direction which, upon termination of the applied field, allows the moments to rotate back to the original easy direction. Depending upon the initial direction of magnetization of the first element, a predetermined signal is induced on its output line indicative of its state. This predetermined signal is transmitted to the second element to energize the input winding thereof and provide a parallel field thereto. During relaxation of the moments of the first element, a transverse field was supplied to the second element which rotates the moments thereof toward the hard direction and closely approaches an angle of 90° with the easy direction of the element. Since the moments of the second element are pre-orientated only a small parallel field need be applied to the second element to cause switching. The second element has been set and, depending upon the direction of the parallel field applied thereto, relaxes into either one direction or the other upon termination of the transverse field. In this arrangement it is obvious that both the pre-orientation windings could be energized simultaneously with termination of the transverse field to the first element taking place first. Further, such a transfer circuit may be made to operate reversibly by reversal of the times at which the pre-orientation windings are energized.

While the arrangement described above provides transfer of information from one bistable element to another, the information originally retained in the first element is not destroyed. While some logic may utilize such non-destructive transfer of information, in shift registers and the like where information is entered in serial fashion and the information of a binary 1 is represented by a positive signal while a binary 0 is represented by no signal, the transfer of information is necessarily destructive in nature. In the above described circuit such destruction of information is accomplished by providing a further transverse field after interrogation of the element by energization of the pre-orientation, to rotate and align the moments of the element closely into the hard direction such that upon termination of this destructive transverse field approximately half the moments rotate to one direction along the easy direction of the element while the remaining moments rotate to the opposite direction. Thus the magnetization of the element is substantially zero due to the splitting up of the magnetic moments.

Further, when more than two bistable elements are provided for shifting information to provide a static magnetic delay line, when interrogation is provided by energization of the pre-orientation windings, the possibility of retrograde transfer is prevalent and as such, suitable biasing means are provided in the transfer loop coupling adjacent elements as shown in another embodiment of this invention.

Accordingly, it is a prime object of this invention to provide a novel high speed magnetic transfer circuit.

Another object of this invention is to provide a novel high speed transfer circuit employing metallic magnetic thin film elements.

Still a further object of this invention is to provide a shifting register employing a novel magnetic transfer circuit having biasing means connected in the transfer circuits to prevent retrograde transfer of information.

Yet another object of this invention is to provide a novel magnetic device capable of being employed in ternary type logic.

The foregoing and other objects, features and advantages of the invention will be apparent from the following more particular description of preferred embodiments of the invention, as illustrated in the accompanying drawings.

Figure 1:
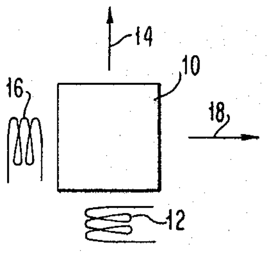
FIG. 1 is a representation of a magnetic element in accordance with this invention.

In FIG. 1 there is schematically shown a film 10 of ferromagnetic material forming a bistable magnetic element, which is fixed to a suitable support, (not shown). There is provided a driving means schematically represented by a winding 12 which produces a magnetic field indicated by arrow 14 which, in the example shown, is assumed to be the "hard" direction. There is furthermore shown a control means schematically represented by a winding 16 adapted to apply a magnetic field as indicated by arrow 18 which is assumed to be the "easy" direction.

The ferromagnetic film 10 is made in a manner that in the rest condition, that is, when no external magnetic field is applied, the resultant magnetic vector of the film element 10 will be pointing in the "easy" direction, that is in the direction 18 or in a direction opposite thereto.

Such films are extremely thin, in the neighborhood of 500 to 3000 angstrom units and may be made by depositing the ferromagnetic material while a constant magnetic field is applied, that is while under the influence of a magnetic field. The deposition is made, for instance, by evaporation or electroplating.

Figure 2:
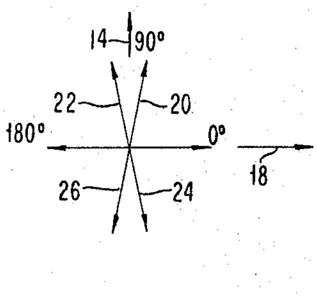
FIG. 2 represents the magnetic forces and fields applied to the element of FIG. 1.

Referring to FIG. 2, the resultant magnetic vector of the element 10′ will, in its rest condition, be pointing in the 0° direction or in the 180° direction, that is it will be parallel to the "easy" direction 18. If there is applied a magnetic field H in the "hard" direction 14, by applying a current through the winding 12 of FIG. 1, the resultant magnetic vector of the film 10 is rotated from its original position of 0° or 180° toward the 90° direction, as is shown by vectors 20 and 22, respectively. If the field applied in the "hard" direction is opposite to the direction 14, the vector will be rotated into the opposite direction as shown by vectors 24 and 26 respectively. The resultant magnetic vector reaches or assumes the maximum angle of ±90° for a given value of the field H, which value is $$H=\frac{2K}{M}$$

where K is the magnetic anisotropy constant and M the magnetization of the magnetic material. If the field H does not reach the above indicated value, but reaches only a value which is smaller, the resultant magnetic vector does not rotate completely into the ±90° position.

If under these latter conditons, the magnetic field H is turned off, the resulting magnetic vector falls back into the initial position of 0° or 180°, respectively, from whichever direction it has originaly started.

Figure 3:
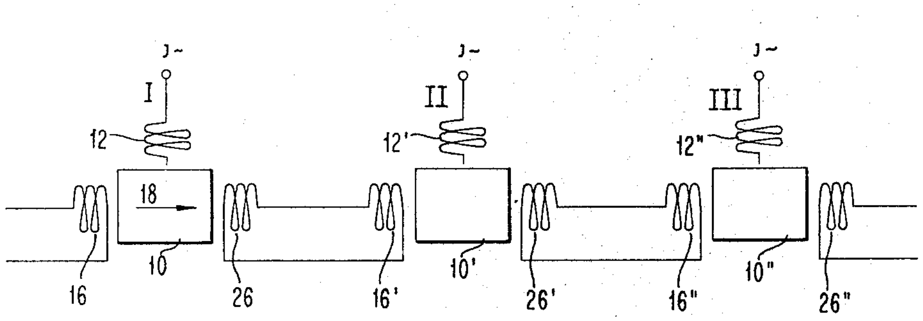
FIG. 3 represents an embodiment of this invention.

In FIG. 3, there are shown three consecutively arranged bistable elements 10, 10′ and 10″. The means to apply and detect magnetic fields are again schematically represented by windings. The physical performance of the elements and of the means to produce and detect magnetic fields will be described later with reference to FIGS. 12, 13 and 14. The element 10 is inductively coupled with a drive winding 12, a control winding 16 as shown in the FIG. 1 and with a detecting winding 26. The element 10′ is similarly inductively coupled with a driving winding 12′, a control winding 16′ and a detecting winding 26′ while the element 10″ is inductively coupled with a drive winding 12″, a control winding 16″ and a detecting winding 26″. The three elements 10 respectively have their drive coil 12 connected with a clock pulse source (not shown) adapted to provide a sequence of pulses as is shown in the FIG. 4. For ease of presentation, the different elements 10 are considered as different locations labelled I, II and III with the signals as shown in the FIG. 4 similarly designated.

In order to explain the principle of the present invention, let it be assumed that the "easy" direction of the elements 10, 10′ and 10″ is again the horizontal direction as indicated by arrow 18. If it is desired to convey a binary condition as represented by the element 10 and indicated by the arrow 18 to the adjacent element 10′, the direction of the magnetization of element 10 has to be determined and enough energy must be supplied to rotate the resultant magnetic vector of element 10′ into the direction 18, assuming the element 10′ is originally in an opposite state of remanent flux density. The energy necessary to do this may be taken from the output winding 26 by rotating or varying the magnetization of element 10 and utilizing the field variations inside the winding 26 produced thereby. The energy, which in this way becomes available, is, however, not sufficient to completely rotate the magnetic vector of the element 10′ into its opposite direction. This is particularly true of branching where several elements are to be switched from a single element. One way to overcome this difficulty is to amplify the current. The very low internal impedance of the winding 26 makes this a very difficult task. Furthermore, it must be kept in mind that the elements are small and extremely thin and this is necessarily also true for the windings 16 and 26 which have to be in very close proximity of the magnetic elements 10 so that it is obvious that for this reason, too, the inclusion of amplifiers betwen the detecting or output windings 26 and the control or trigger windings 16 represent a difficult technical problem.

According to the present invention, these difficulties are overcome in the arrangement shown in FIG. 3 by conveying a binary condition from an element to a successive one in the following manner: considering, for instance, that the winding 12′ is energized to provide a magnetic field in the "hard" direction to the element 10′ which is of such strength that the resultant magnetic vector thereof is almost, but not completely, rotated into the 90° direction as represented by the vectors 20 or 22 in FIG. 2. If the magnetic vector was originally pointing to the right, it is rotated into the position 20, if it was originally pointed to the left, it is rotated into the position 22. Next, the resultant magnetic vector of the element 10 is varied in any feasible manner, for instance, rotated, so that there is induced in the output winding 26 a signal which is conveyed to the winding 16'. The field of the winding 16', although it is relatively weak, is sufficient to place the resultant magnetic vector of the element 10' which is now in a position where it is pointing substantially into the 90° direction, either somewhat to the right or to the left of the 90° direction. For instance, if the vector was originally in the 180° direction and was rotated into the position 22 by a driving field and if a trigger field is pointing to the right, it will place the vector into the position 20. Analogously, if the vector originally was in the 0° direction, a driving field will rotate it into position 20, from which it can be set by a control field provided by energizing winding 16' to the left or it will remain to the right of the "hard" direction 14. After the setting of the magnetic vector of the element 10' by a slight amount to the left or the right of the 90° or "hard" direction has taken place, the driving field produced by energization of the winding 12' is discontinued, the vector of the element 10' will return into its rest position, which is the "easy" direction and will point to the left (180° direction) or to the right (0° direction) in accordance to how it was set by the small trigger signal field applied by the trigger winding 16'. The winding sense of the windings 26 and 16' is chosen such that the setting of the magnetic vector of the successive element 10' will be in the correct direction. This selection of the winding sense is of such elementary nature that a more detailed explanation is not necessary and, therefore, not given.

It is obvious that the same setting to the left or right of the "hard" direction may also be obtained by deviating the magnetization of element 10' with a driving field not into the "hard" direction 14 but into the direction opposite thereto.

Figure 4:
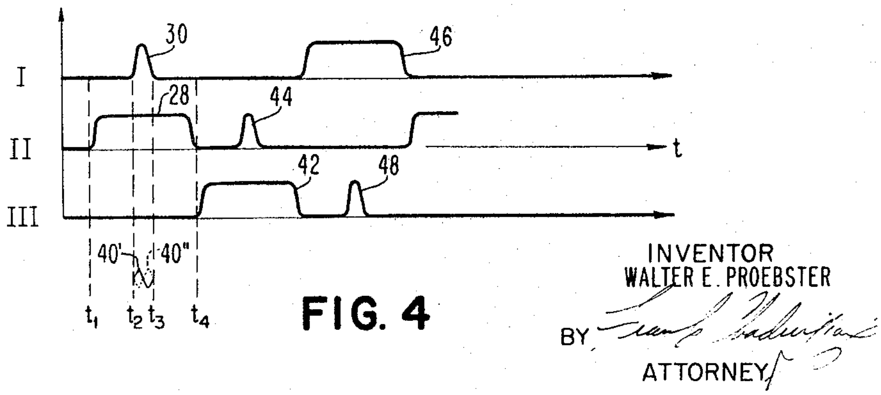
FIG. 4 is a representation of the various signals applied to the circuit of FIG. 3.

Referring to the FIG. 4, there is shown a timing chart of the signals as applied to the elements 10, 10' and 10'' of FIG. 3 for the purpose of advancing the binary state from one element to the successive element. Along the abscissa, there is plotted the time and along the ordinate there are plotted the different signals which occur and reference is made to different times, labelled $t_1$, $t_2$, $t_3$ and $t_4$, during the application of the various signals shown to further explain the circuit operation. At the time $t_1$, there is applied to the winding 12' a driving pulse 28 of a given duration ($t_1$ to $t_4$) providing a similar shaped field to the element 10' in the location II. This field will rotate the resultant magnetic vector into approximately the "hard" direction. Next, at the time $t_2$, there is applied to the drive winding 12 a detecting pulse 30 which provides a field causing some rotational movement of the resultant magnetic vector of element 10 in the location I. The rotation of the magnetization of element 10 induces in the winding 26 a signal which may be shaped as shown by a wave 40', which signal also appears across the winding 16', where it produces a field which is applied to element 10'. In accordance to whether the resultant magnetic vector of the element 10 is in the same or in the opposite sense of the "easy" direction 18, there is produced the signal 40' or a signal of opposite polarity as indicated by a signal 40''. It is the second half of the wave 40' or 40'' which determines the final position of the magnetic vector of the element 10', that is, which determines whether the resultant magnetic vector of the film element 10' in the location II will be pointing to the left or to the right. If, for instance, the magnetic vector of the element 10 has been pointing to the right and this binary state has to be transferred to the element 10', the windings 26 and 16' have to be coupled in such a way that the field of winding 16', produced by the second half of the wave 40, is of such direction that it will set the magnetic vector of the element 10' to point somewhat to the right. With the termination of the pulse 28 at the time $t_4$, the magnetization of the element 10' will align into the "easy" direction and thus the resultant magnetic vector of the element 10' will relax to the 0° direction pointing to the right, if, as assumed above, the resultant magnetic vector of element 10 originally was pointing to the right.

In order to advance the binary condition of the element 10' to the magnetic element 10'', in the analogous way there is first applied a driving pulse 42 to the winding 12'' of the element 10'' in the location III, with the purpose of approximately aligning the magnetic vector into the "hard" direction. Next, there is applied to the winding 12' a detecting pulse 44 which produces a variation of the magnetic vector of the element 10' and thus induces a voltage across the coil 26', which also appears across the winding 16'', inducing a small control field for the magnetic film 10'', which again sets the magnetic vector thereof somewhat to the left or the right of the "hard" direction (with the above assumption to the right). Thereupon, with the termination of the pulse 42, the vector of this element will return to the "easy" direction where it will be pointing to the left or to the right in accordance with the original state of the resultant magnetic vector of the element 10' (which was assumed to be pointing to the right).

In the same manner, a pulse 46 is provided to deviate the magnetic vector of the element in the next following position, assumed to be again position I, into approximately the "hard" direction and a shorter detecting pulse 48 serves to rotate the magnetization of the element 10'' to produce as signal in the detecting means 26''.

Figure 5:
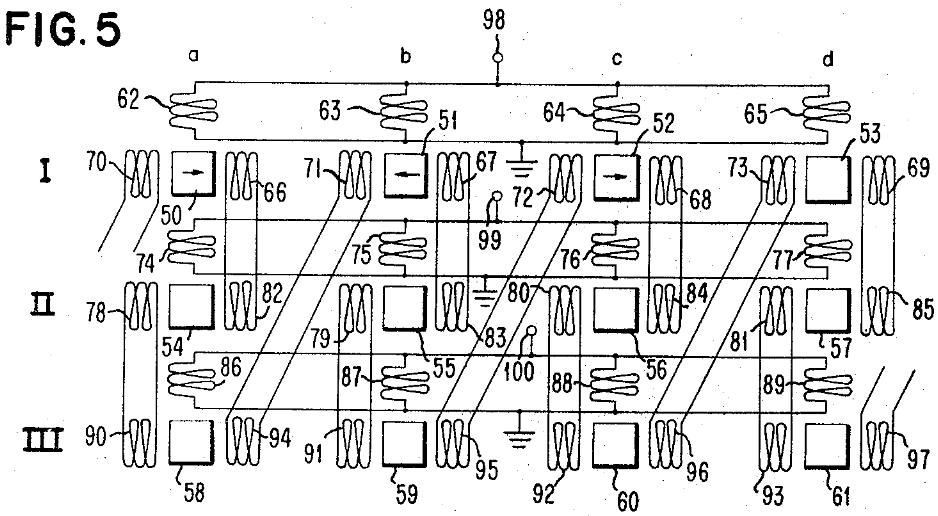
FIG. 5 is another embodiment of this invention.

FIG. 5 shows schematically an arrangement for storing a number represented in binary fashion and for shifting the number from a given position to the next successive position. A timing chart of the signals applied to shift horizontally from one position to the next in the embodiment of FIG. 5 is shown in the FIG. 6.

Referring to the FIG. 5, a group I is shown comprising a line of bistable elements 50 to 53, a second group II, comprising a line of bistable elements 54 to 57 and a third group III, comprising a line of bistable elements 58 to 61. There are coupled with each of the elements 50 to 53 a drive winding 62 to 65, respectively, a detecting winding 66 to 69, respectively, and a control winding 70 to 73, respectively. In the group II, there are coupled with each of the elements 54 to 57, a drive winding 74 to 77, respectively, a detecting winding 78 to 81 respectively, and a control winding 82 to 85 respectively. Finally, in the group III, there are coupled with each of the elements 58 to 61 a drive winding 86 to 89, a control winding 90 to 93 and a detecting winding 94 to 97, respectively. Signals to the drive windings 62 to 65 of group I are applied between a terminal 98 and ground, while signals to the drive windings 74 to 77 of group II are applied between a terminal 99 and ground and signals to the drive windings 86 to 89 of group III are applied between a terminal 100 and ground.

Figure 6:
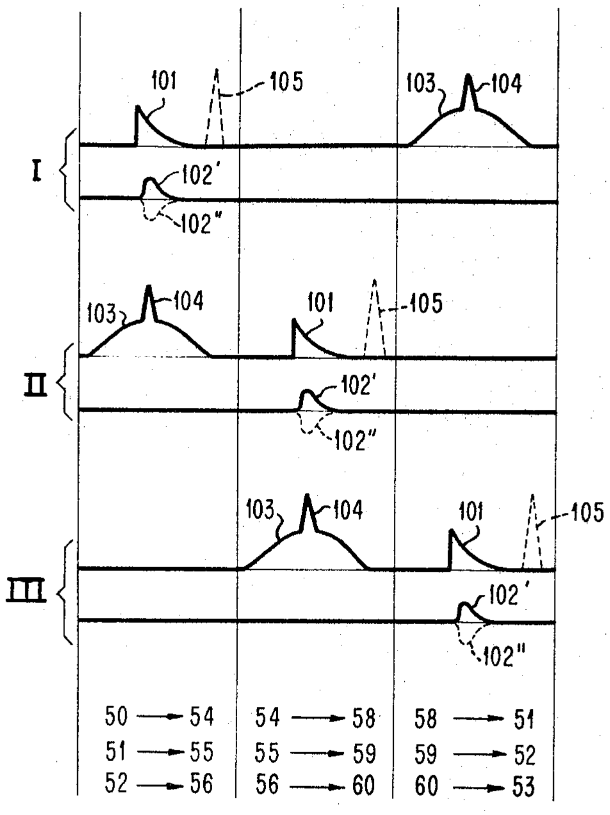
FIG. 6 is a representation of the signals applied in operation of the embodiment of FIG. 5.

In FIG. 6, there are plotted along the abscissa the time and along the ordinate the different signals applied or appearing in connection with the operation of the circuit of FIG. 5. Pulses designated with reference numeral 101 are pulses applied to the drive windings to produce in the detecting windings a signal indicating whether the resultant magnetic vector of the interrogated element is pointing to the left or to the right. A signal picked up by the detecting windings, which indicates the binary position of the interrogated element, is designated with reference numeral 102', 102'', whereby again the one binary state causes the signal 102' to appear and the other binary state causes the signal 102'' to be produced. Designated with reference numerals 103, 104 are a number of pulses which are applied to the drive windings which serve to align the resultant magnetic vector into the 90° or "hard" direction. Roman numerals I, II and III shown at the left of the FIG. 6 indicate the groups of elements to which the aforementioned pulses relate.

In order to explain the operation of the circuit of FIG. 5, let it be assumed that there is stored in the first three elements 50, 51 and 52 from the left of the group I a binary number "101." It is assumed that the resultant magnetic vector, if pointing to the right, represents a binary 1 and that the resultant magnetic vector, if pointing to the left, represents a binary 0. The vectors representing the starting condition "101" of the elements are shown in the group I.

As shown in FIG. 6, there is first attained a certain premagnetization of the elements 54 to 57 of the group II by the application of pulse section 103 to the drive windings 74 to 77 of these elements. Next, there is applied a detecting pulse 101 to the drive windings 62 to 65 of the magnetic elements 50 to 53 of the group I. This pulse 101 produces in the detecting windings 66 to 68 signals 102 (in 66 signal 102', in 67 signal 102'', in 68 signal 102') which also appear in the control windings 82 to 84. At the time the signal 102 is at its maximum or minimum, there occurs the needle shaped pulse section 104 which momentarily aligns the magnetic vectors of elements 54 to 57 into the "hard" direction. The needle shaped section of pulse 103 may produce a field which deviates the magnetization of elements 54 to 57 either approximately or completely into the 90° or "hard" direction or it may even produce a stronger field than is necessary to align the magnetization exactly into the 90° direction. This does not matter because, according to this example, the control pulse 102 is of longer duration than is the drive pulse section 104, so that the resultant magnetic vectors while returning from their 90° direction are under the influence of the field produced by energization of control windings 82 to 84. The couplings between or the arrangement of the windings 66, 82 and 67, 83 and 68, 84 are such that the sense of the coupling of the detecting windings 66, 67, 68 and the control windings 82, 83 and 84 is disposed so that the trailing half of the detecting or control pulse 102 will set the magnetization of the elements 54, 55 and 56, respectively, to point to the right or left in agreement with the starting condition of elements 50, 51 and 52. As the pulse 103, 104 terminates the resultant magnetic vectors of these elements will return to their "easy" direction and be pointing to the left or right as determined by the detecting signals 102' and 102''. This means that simultaneously with the conveyance of the binary state "1" of elements 50 and 52 to the elements 54 and 56, there has taken place transference of the binary state "0" of the element 51 to the element 55.

Next, there takes place the application of the premagnetizing signal part 103 to the drive windings 86, 87 and 88 of the group III, followed by the application of the detecting pulse 101 to the driver windings 74, 75, 76 of the group II, producing in the detecting windings 78, 79 and 80 signals 102 corresponding to the binary conditions in the elements 54, 55 and 56. At the time of the maximum or minimum of the signals 102' and 102'', there occurs the needle shaped pulse 104 at the terminal 100, serving to align the magnetic vectors of the elements 58, 59 and 60 into the "hard" direction. As described above, the trailing half of the control pulses 102' and 102'' will set the magnetic vectors of the elements 58, 59 and 60 on the proper side of the 90° direction as this is dictated by the binary condition of the elements 54, 55 and 56. With the termination of pulse 103, 104 elements 58 and 60 are thus conditioned to store a binary "1" and element 59 is conditioned to represent a binary "0."

Repeating the above steps once more with the elements of groups III and I, there is first applied the premagnetizing part 103 to the drive windings 62, 63 and 64 via terminal 98 and successively the driving pulse 101 to the drive windings 86, 87 and 88 of the elements of the group III via terminal 100. This pulse 101 produces in the detecting windings 94, 95 and 96 signals which are in correspondence with the binary condition into which these elements are conditioned. This means that the signals 102' produced in the pick up windings 95 and 97 are of opposite phase than is the signal 102'' produced in the pick up winding 96. Signals appearing in the trigger windings 71, 72 and 73 are identical to those appearing in the detecting windings 94, 95 and 96, respectively. Thus, upon application and more precisely upon termination of the needle shaped pulse 104, applied to terminal 98 at the time when the control signal 102 is at its extreme, the magnetic vectors of the elements 51, 52 and 53 will be set to point to the side as determined by the control signals 102 applied by the control windings 71, 72 and 73. At the end of pulse 103 the resultant magnetic vector of elements 51 and 53 will be pointing to the right, representing a binary "1" and of element 52 will be pointing to the left, representing a binary "0." At the bottom of FIG. 6, there are indicated between the vertical lines the elements between which a transfer takes place caused by the pulses of the same column. The signals 103, 104 are best produced by the superposition of a sharp pulse upon a sine wave with a suppression of the unwanted portions or a suppressor of signals below a given level.

Therefore, the binary condition "1" which was originally stored in element 50, by the above steps has been conveyed to the element 54, then to the element 58 and finally to the element 51. The same is true for the binary condition "0" which was conveyed from element 51 via elements 55 and 59 to the element 52 and for the binary condition "1" which originally was in element 52 and was passed to the element 56, to the element 60 and finally to the element 53. Thus the binary number 101 which was represented by the elements 50 to 52 has been shifted by the above steps by one position to the right and is now represented by the elements 51 to 53.

Provision of three groups I, II and III for the above described shifting process was chosen in order to secure proper operation and to prevent malfunctioning like a reversal of the direction of the flow of the information. It was explained that the drive pulse 101 applied at terminal 98 rotated the magnetic vector of the elements 50 to 52 for the purpose of producing the control signal 102. Considering for the following, in the interest of clarity, only a few selected elements of FIG. 5, it is seen that simultaneously with the variation of the magnetization of element 50 to produce the control signal 102 there is also produced by the variation of element 51 a signal in the control coupling 71 which last named signal appears also across the coupling means 94. As long as there are provided the three lines of elements I, II and III, there is no driving field applied to element 58 during the occurrence of the above signal in the detecting means 94 and no deterioration can take place. Would there be only two lines of elements, the signals which appear in the control means due to the fact that a detecting signal is applied to determine the orientation of the magnetization in the "easy" direction of the interrogated line of elements would impair the transfer of the information to the elements of the information receiving line, because each one of these last named elements would receive information from two different sources.

There has also to be kept in mind that the driving pulse 103, 104 applied, for instance, to the element 54 by the drive winding 74 causes a signal to appear in the control means 82 and thus in the detecting means 66. The larger this signal is, the higher is its tendency to counteract proper transfer of the signal produced by the variation of the interrogated element 50, and thus a proper conveyance of the binary state of element 50 to element 54. In the following, there are given some examples of embodiments in which the above mentioned undesired feedback of energy is minimized.

Reference is first made to the signals 103, 104 as shown in FIG. 6, considering only the elements 50 and 54 and the means coupled thereto. It is seen that in the absence of the premagnetization section 103 the pulse 104 would produce a signal in the means 82, 66 of an amount, that proper operation might be impaired. One way to prevent this is to provide a slow aligning of the magnetization of element 54 into at least part of the "hard" direction as this may be done by the relatively slowly rising pulse portion 103. The drive signal 103, 104 being a superposition of a needle pulse upon the positive half of a sine wave, may, for instance, be dimensioned such that at the start of the needle section 104 the resultant magnetic vector is rotated into a direction of about 70° from the abscissa, and thereby the induced signal, approximately up to this point, has no appreciable influence upon the preceding element. This latter element may, in particular, up to this point, not yet have applied thereto a detecting field.

In the operation described with reference to FIG. 4 the drive pulse 28 is of a rectangular shape. It is applied to the information receiving element II to align it approximately into the 90° direction. During the time interval of the existence of the driving pulse 28 the detecting signal 30 is applied to the interrogated element I, whereby no feedback will take place to the element I, because during this time interval the magnetic vector of the information receiving element II remains constant.

Another way of preventing a deteriorating feedback, as described above, is in the use of the coupling means, for instance in the FIG. 5 the elements 50 and 54 wherein the detecting winding 66 of element 50 is stronger than is the coupling of the control winding 82 of the element 54. If the coupling is performed by windings, the detecting winding 66 has more turns around the element 50 than has the control winding 82 around the element 54.

Generally the arrangement has to be of such performance that during the application of the detecting signal any magnetic variations of the information receiving elements 54–56 must be such that signals produced thereby in their control windings 82–84 are smaller than the signals in the detecting windings 66–68 coupled with the control windings 82–84.

There is also possible a performance of the operation wherein the elements which are to receive an information are set so that they will not produce a signal when driven into the "hard" direction. This performance may again be explained with reference to the two specific lines of binary elements I and II of FIG. 5 and is as follows: After the end of the control signal 101 and the driving signal 103, 104 (see FIG. 6), applied to the group I and before the application of the control signal 101 and the driving signal 103, 104 to the group II there is applied a destructive signal 105 to the terminal 98, that is to group I. The signal 105 has to be at least so powerful that it brings the magnetic vector of each of the elements 50 to 53 exactly into the 90° or "hard" direction. In the absence of any control field in the "easy" direction, that is from energization of either one of the windings 66 or 70 in the case of element 50 for instance, with the termination of the signal 105 the resultant magnetic vector, in rotating back, has no reason to turn to the left or the right, so that, under these conditions, the magnetic film breaks up into a number of individual domains of which at random one half will fall back into their rest position to the left and the other half to the right, so that at the end of pulse 105, there will be as many domains oriented to the left as there will be domains oriented to the right, and the total or resultant magnetic vector of the elements I in the rest condition will be zero. Thus, on a new reading-in into the elements 50 to 53, upon application of a driving field to align the resultant magnetic vector of the elements into the "hard" direction, the resultant effect of the domains rotating from the random distribution of pointing to the left and to the right into the 90° or "hard" direction, will be zero so that there will not be produced any magnetic field.

The provision of a special pulse 105 for producing a splitting up of the interrogated elements like those of the group I may be omitted by making the detecting pulse 101 to be of proper energy and width for destructive read-out. In this case the pulse 103, 104 has to decrease to such an extent that the elements of group II are substantially aligned again into the "easy" direction by the time the magnetic field produced by the (diminishing) pulse 101 is still at a value where the magnetization of the elements of group I is at least substantially aligned into the "hard" direction.

Generally it is seen that there takes place a non-destructive read-out of an element by keeping the detecting signal 101 below the limit which produces a rotation of 90°. If the detecting pulses 101 are chosen such that they drive the resultant magnetic vector of the interrogated elements exactly into the "hard" direction, the read-out is destructive.

Figure 7:
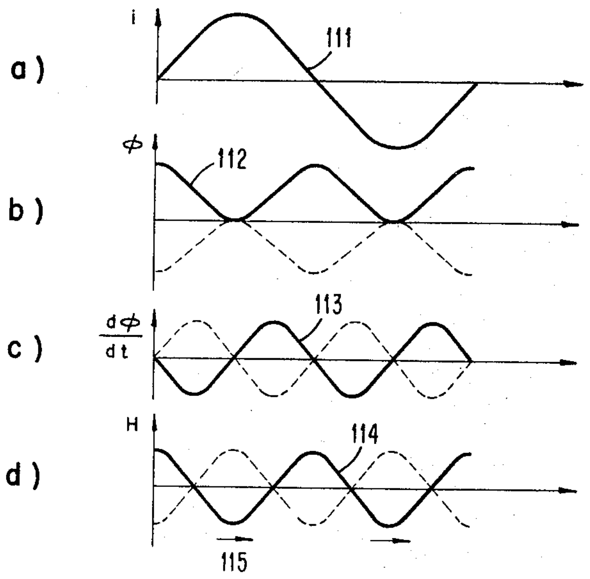
FIG. 7 represents a different signal chart for operation of the embodiment of FIG. 3.

Reference is now made again to FIG. 3 and also to FIG. 7 for the purpose of explaining the operation of conveying a binary condition from an element to the successive one with the use of an A.C. driving source. For the purpose of explanation, there are considered only the elements 10 and 10′, together with the couplings belonging thereto. In FIG. 7, there is shown and plotted along the ordinate various values of signals which will be explained as the description proceeds. Assuming that a sine wave current designated 111 (FIG. 7) is applied to the driving windings 12 and 12′, there is produced a detecting field across the element 10 and a driving field across the element 10′ that drives the magnetic vectors thereof into the "hard" direction. Assuming that the resultant vector of element 10 is originally pointing to the right in the "easy" direction, there is produced a flux 112 in the winding 26 so that an induced voltage appears across the windings 26 and 16′ which is proportional to the derivative of the flux, as shown by a curve 113. Assuming that the closed circuit comprising the windings 26 and 16′ and the connections thereof represent an inductive impedance, the current in this circuit has a 90° phase delay with reference to the voltage. This current, and the magnetic field produced by energization of the winding 16′ thereby, are represented by a wave 114. In the case that the magnetic vector of the element 10 is pointing the the left, the curves shown in solid lines must be replaced by the curves shown in dash lines.

As mentioned above, the A.C. current 111 is also applied to the driving coil 12′ to produce a driving field and the maxima thereof coincide with the alternate maxima of the field or current 114 of the control winding 16′, so that the magnetic vector of the element 10′ is at a maximum deviation from its "easy" direction when the maxima of the field produced by the current 114 to the control winding 16′ occurs. It is seen in FIG. 7 that at the maxima and minima of the driving current 111 producing the driving field to element 10′, the magnetic control field 114 of the control winding 16′ is always pointing in the same direction, which may be the direction indicated by arrows 115, so that the resultant magnetic vector of the element 10′ is always driven in the same direction by the field of coil 16′ at the time when it is deviated into one and into the opposite sense of the "hard" direction by the driving field of winding 12′. It is also seen that the resultant magnetic vector of element 10′ is always in the "easy" direction when the control field 114 is opposite to the direction for proper alignment (115) and thus the field 114, when pointing in the opposite direction, is of no influence.

The above is of particular importance in the case when the element 10 is interrogated by a repetitive deviation into both of the "hard" directions (90° and 270°). In such operation the driving field of winding 12 must be below a magnitude to cause a full 90° deviation in order to prevent any splitting of the magnetization and thus premature destruction of the information.

There is yet another aspect to be considered in driving two adjacent elements with A.C. signals. For clarity, let it be assumed that initially the resultant magnetic vector of element 10 is pointing to the right and the resulting magnetic vector of the element 10' is pointing to the left. By applying the A.C. signal 111 to the winding 12 and also to the coil 12', the resultant magnetic vector of element 10' is rotated out of its "easy" direction into the "hard" direction by the same amount as is rotated the resultant magnetic vector of the element 10. The slight rotation of the magnetic vector of the element 10' produces, in the trigger coil 16', a variable magnetic flux which in turn produces a voltage across the winding 26 of element 10 of equal, but opposite magnitude than the voltage produced across this same winding by rotation of the magnetization of element 10. These two voltages, therefore, act against each other and a proper operation is impeded. In order to practice the above described transfer of the binary state it is therefore necessary to counteract this phenomena. This can be done, for instance, by destroying in the element to receive the information any previous information as this was described with reference to the pulses 105 of FIG. 6. In such an embodiment there is applied a destructive signal like a pulse 105 to the interrogated element 10 after each transfer operation has taken place or to the information receiving element 10 before the transfer operation will take place.

According to a further embodiment of the present invention, the above feature may also be dealt with by inserting an additional voltage source into the circuit of the coils 26 and 16'. Such an arrangement is shown in FIG. 8.

Figure 8:
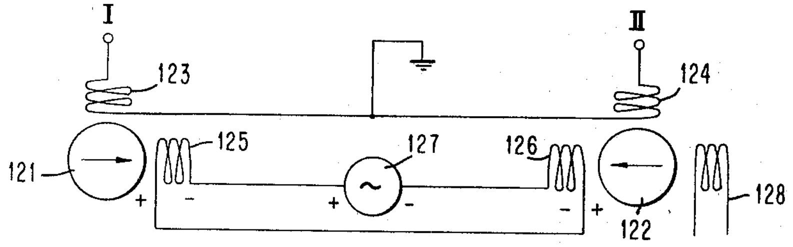
FIG. 8 represents another embodiment of this invention.

Referring to the FIG. 8, two magnetic bistable elements 121 and 122 are shown each having a drive winding 123 and 124, respectively. A detecting winding 125 is coupled to the element 121 which is connected with a control winding 126 coupled to the element 122 through a voltage source 127. In operation, the voltage source 127 supplies an A.C. voltage of a phase that is opposite to the phase of the voltage induced across the winding 126 which is considered as being of a predetermined phase relationship with regard to the A.C. driver wave 111. A reset means 128 is provided for the element 122 which is adapted to be selectively energized to produce a field of predetermined direction, assumed to be pointing to the left as shown, to establish element 122 in the indicated remanent stable state.

In operation there is first applied a sine wave 111 (FIG. 7) to the drive winding 124 to drive the magnetic vector of element 122 toward the "hard" direction. At the time of the maximum deviation thereof a reset field is applied by energization of the reset winding 128 to urge the magnetic vector of element 122 to point to the left so that upon termination of the driving signal 111 it will align in the "easy" direction and be pointing to the left. There is now assumed the case where the magnetization of the element 121 is pointing to the right, as this is shown in FIG. 8. By applying now, as a second step, the driving field 111 to the windings 123 and 124, there appear the following voltages: The voltage across winding 125 which may be of the polarity as shown in FIG. 8, the voltage across winding 126 which is of opposite polarity, because the magnetization of element 122 is opposite the magnetization of element 121 and the voltage across the voltage source 127, which is made to be opposite to the voltage across 126 and thus is of the same sense as is the voltage across 125. Therefore, the voltage across 127 and winding 126 compensate one another and the resultant voltage is the voltage supplied by the winding 125 which will, during the deviation due to the current through the driving windings 123 and 124, drive the resultant magnetic vector of element 122 to point to the right. Upon termination of the driving field 111 the magnetization of the element 122 will be set as desired.

In the case that the setting of the magnetization is done with a plurality of oscillations produced by an oscillating driving field 111 at each maximum or minimum of the driving current 111 the control field applied by the energization of winding 126 of the element 122 is of such a direction that the magnetic vector of the last named element is urged into the position of pointing to the right.

If the vector of element 121 would originally have been pointing to the left and thus have been of the same direction as the vector of element 122, the last named vector will remain to point in the left direction, because the resultant voltage in this case is of a polarity as to drive to the left.

Figure 9:
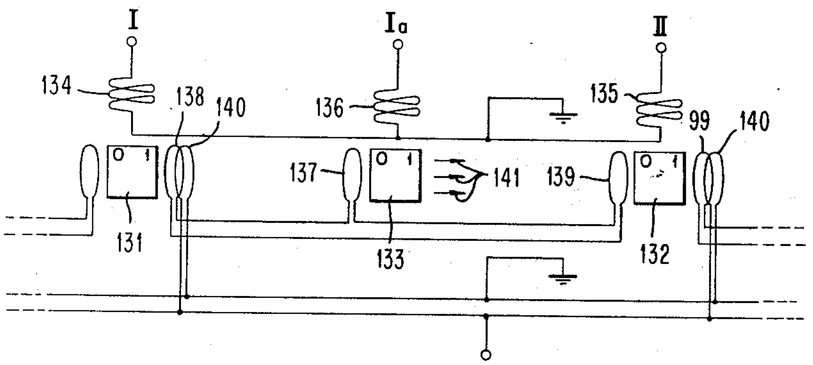
FIG. 9 represents another embodiment of this invention.

An embodiment of an additional voltage source is shown with reference to FIG. 9. Referring to the FIG. 9, there is a bistable magnetic element 131 and 132 and an auxiliary bistable element 133. The bistable condition of element 131 has to be transferred to the element 132. Each of the elements 131, 132 and 133 are provided with a driving winding 134, 135 and 136, respectively, while the element 131 is provided with a detecting winding 138 connected with a detecting winding 137 on the element 133 and a control winding 139 on the element 132. Each of the elements 131 and 132 is further provided with a reset winding 140. The element 133 is adapted to provide a resultant magnetic vector, in its easy direction, which always points to the right, as indicated by arrows 141. Such an element is made, for instance, by the combination of a ferromagnetic film 133 and a permanent magnet establishing a permanent field in the direction of the arrows 141 in the region of the film 133. For the present explanation, it is assumed that the pointing of the resultant magnetic vector to the left represents a binary "0" and the pointing of the magnetic vector to the right represents a binary "1" as indicated in the binary designations in each bistable element 131, 132 and 133 of FIG. 9. The transfer of information from element 131 to the element 132 is performed by the following two steps. (1) Application of a driving signal wave to the driving means II and a reset signal to the reset windings 140. This reset signal will set the resultant magnetic vector of element 132 to point to the left, which is the "0" condition. It may be noted that the reset signal, which is also applied to the element 131, has no influence on the magnetization of element 131, because no driving signal is applied thereto. (2) Application of a driving signal wave to driving means I, I*a* and II. At the occurrence of these signals, the element 132 always starts off from its binary "0" state.

(a) If element 131 is also in the "0" state, the three voltages $V_I$, $V_{Ia}$ and $V_{II}$, produced in the windings 138, 137 and 139 respectively, are of such a polarity that $V_{Ia}$ is of opposite direction with regard to $V_I$ and $V_{II}$. Assuming that the absolute values of all voltages are equal, element 132 will remain in the "0" state, which means that the state of element 131 is transferred to element 132.

(b) If element 131 is in the "1" state, the voltages $V_I$ and $V_{Ia}$ are of the same polarity, which is opposite to the polarity of the voltage $V_{II}$. Again assuming that the absolute values of the voltages are equal, there will result a driving voltage which will drive the element 132 to the right, that is into the "1" state, which transfer from binary "0" to binary "1" may take place during a single oscillation or a plurality of oscillations of the driving wave applied to locations I, I*a* and II. Thus, a transfer of the binary "1" from element 131 to the element 132 is achieved.

The incorporation of the above described additional voltage source into arrangements comprising a greater number of binary elements is done in the way as just described and thus is so obvious that a specific description is not necessary.

Figure 10:
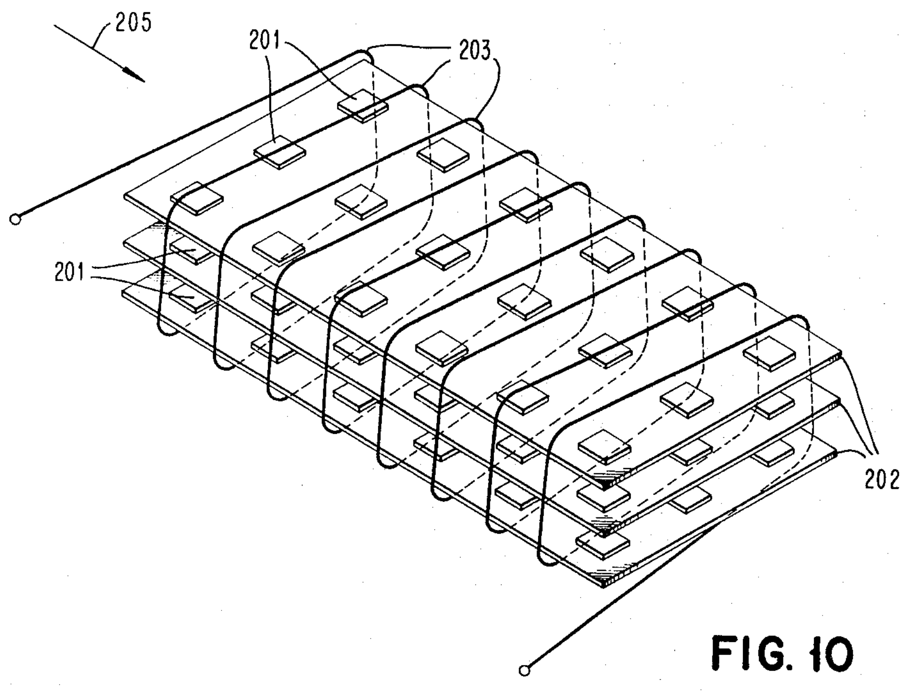
FIG. 10 illustrates another embodiment of this invention.

In another embodiment, the individual reset means 140 as shown in the FIG. 9 is avoided with the provision of a single reset means which is common to all the elements of the arrangement and is shown in the FIG. 10. Referring to the FIG. 10, a plurality of bistable elements 201 of a shift register such as shown in the FIG. 5 are located in a plurality of planes 202 which are disposed one upon the other. Reset means, comprising a winding 203 is provided wound such that its axis is parallel to the "easy" direction of the elements 201 as represented by an arrow 205 and such that all the elements are inside of its windings. The coil 203 may preferably have a rectangular-like cross section, as this is shown by FIG. 10. In the interest of clarity, the driving, detecting and control windings of the individual elements 201 are not shown. In view of the foregoing, it is obvious that a reset field applied by the reset winding 203 will affect only those elements which are driven into the "hard" direction by their driving means.

A still further embodiment with an additional voltage source 127 as mentioned in connection with FIG. 8 will be described in the following. It was stated in connection with FIG. 8 that this voltage source supplies a signal which serves to prevent the signals produced by the drive into the "hard" direction and picked up by the detecting winding 125 and the control winding 126 to compensate each other in the case of oppositely pointing magnetic vectors. The auxiliary element 133 of FIG. 9 serves to produce a signal which counteracts the voltage produced in the control winding 126 by the element 122 when it is in the reset condition. Signals having this characteristic obviously can be produced in various ways.

Figure 11:
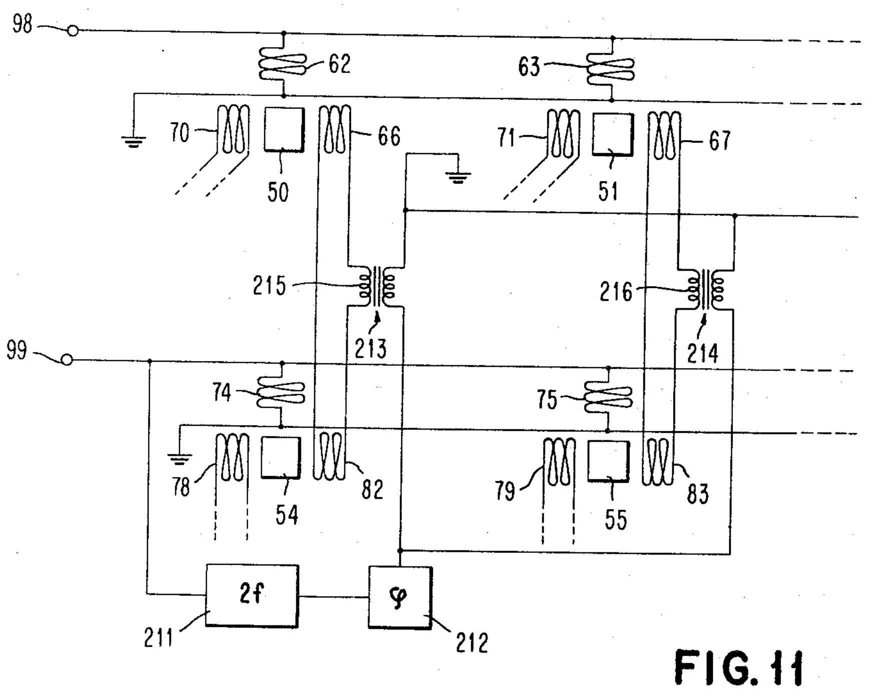
FIG. 11 is another embodiment of this invention.

One other way is shown by the performance according to FIG. 11, for which there is chosen the example of the shift arrangement of FIG. 5. Only the upper section on the left hand side of FIG. 5 is represented in FIG. 11. In order to prevent a repetition of the description, the same parts are provided with the same reference numerals and dashed lines indicate the extensions to the parts of FIG. 5 which are not shown in FIG. 11. In addition, there is provided a frequency doubler 211 and a phase shifter 212, connected in series between the terminal 99, connected to an external source (not shown) adapted to supply driving energy for the elements II and a number of transformers 213, 214, having secondary windings 215 and 216, respectively, which are disposed between the windings 66, 82 and the windings 67, 83 respectively. Reset means are not shown in the interest of clarity.

The oscillatory wave supplied at terminal 99 to the driving windings 74, 75, for instance the wave 111 of FIG. 7, is also supplied to the frequency doubler 211 (FIG. 11) and therefrom to the phase shifter 212. A wave of double the frequency of wave 111 is thus produced and is adjusted to have a desired phase. The desired phase is of such value that it is identical with the phase of a signal detected by the control winding 82 when the resultant magnetic vector of element 54 is representing a binary "1." This means that the voltage across the secondary winding 215 of the transformer 213 is of opposite phase than is the voltage across the control winding 82 if the element 54 is in its rest or "0" condition. A frequency doubler and a phase shifter are devices which are well known in the art and therefore are not described in detail.

In operation, for explaining the shifting of the binary state of element 50 to element 54, and of element 51 to element 55, there is again assumed that there are produced by a driving wave for the elements I, a voltage $V_I$, in the windings 66, 82; by the transformers 213 and 214 a voltage $V_t$, in the secondary windings 215 and 216 thereof; and by the driving wave for the elements II, a voltage $V_{II}$, in the windings 82 and 83. It is furthermore again assumed that the disposition is such that the absolute values of these voltages are substantially equal, that is $$V_I \cong V_t \cong V_{II}$$

For transferring a binary condition there is, analogously to the operation of FIG. 9, first applied a reset signal to reset means not shown and a driving signal to the bistable elements of Group II. The reset means may comprise coupling means which are individual to each element as represented by the means 140 in FIG. 9 or may comprise a large field producing means common to all elements as shown by the coil 203 in FIG. 10. While the reset signal is being applied, a driving field is supplied by energization of the terminal 99 to the windings 74, 75, so that all the elements of the group II are reset into the binary "0" state. Thereupon, there is applied a driving wave, for instance wave 111 of FIG. 7, to the windings 62, 63 and 74, 75 of the groups I and II, respectively, which aligns the magnetization of these elements perodically into the "hard" direction. Considering only the elements 50 and 54, there occur again the two cases where (1) the element 50 represents a binary "0". In this case, there appear the voltages $V_I$ across the winding 66 and $V_{II}$ across the winding 82 of a polarity which is opposite the polarity of $V_t$ on the secondary winding 215 of the transformer 213, and the element 54 remains in the binary "0" state. Thus at the end of this shifting step element 54 is in the same binary state as is element 50. (2) The element 50 represents a binary "1." In this case, the voltage $V_I$ across the winding 66 and the voltage $V_t$ across secondary winding 215 of the transformer 213 are of a polarity which is opposite to the polarity of voltage $V_{II}$ across the winding 82, and therefore, $V_I$ and $V_t$ will predominate over $V_{II}$ and will in one or a plurality of oscillations of the driving field switch the resultant magnetic vector of element 54 into the binary "1" state. Therefore, at the end of this switching step the element 54 is conditioned into the binary state of the element 50. The analogous considerations apply obviously to the elements 51 and 55.

As a further example wherein the previously mentioned difficulty caused by the counteracting of the magnetization of the elements 10 and 10' (FIG. 3) may be overcome and which does not necessitate an additional voltage source, the coupling of the output windings 26 is made stronger than the coupling of the control windings 16, specifically, for instance, by providing the windings 26 with additional turns.

Figure 12:
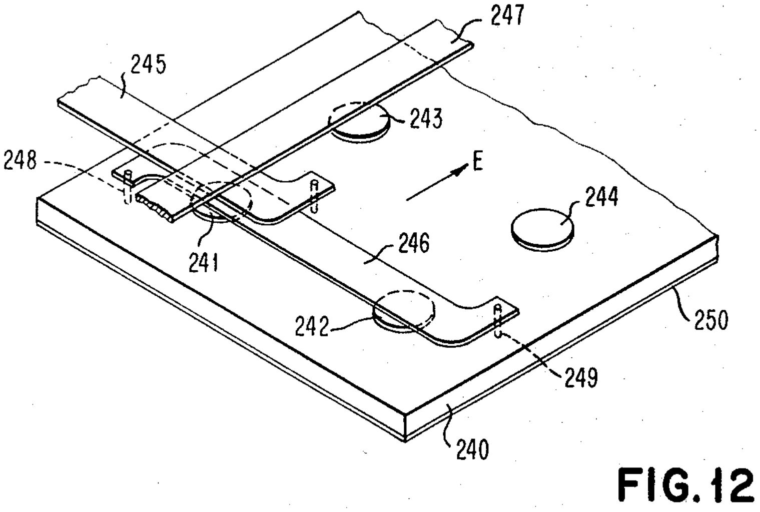
FIG. 12 illustrates a physical embodiment of a circuit arrangement employed in practicing the present invention.

Referring to the FIG. 12, there is shown an embodiment of the physical arrangement of bistable ferromagnetic elements and the couplings therewith as may be employed for practising the present invention. Suitable support 240 is provided having four bistable elements 241, 242, 243 and 244. The control means for the element 241 is represented by a layer shaped conductor 245. A detecting or output means for this element is formed by the left hand part of a layer shaped conductor 246, the right hand part thereof forming a control or trigger means of the element 242. A driving means for the elements 241 and 243 is formed by a conducting layer 247. Connections 248 and 249 are provided between the conductor 246 and a conductive layer 250 fixed to the bottom surface of the support 240 and are shown as leading through a number of holes in the support 240. The conductive layer 250 provided on the lower side of the support 240 is connected to ground. The magnetic elements 241, 242, 243 and 244 and the conductors 245, 246 and 247 are formed by an evaporating or electroplating process. Also formed by an evaporation process may be insulation where necessary between the elements 241, 242, 243, 244 and the conductors 245, 246 and 247. For the sake of clarity, only part of the coupling means of the elements 242 and 243 are shown and none is shown for the element 244. The insulation between the conducors is also not shown for simplicity. The continuation of these parts over a complete array is believed obvious from the inspection of FIG. 12. The "easy" direction of the elements 241, 242, 243 and 244 is parallel to a vector labelled E.

Figure 13:
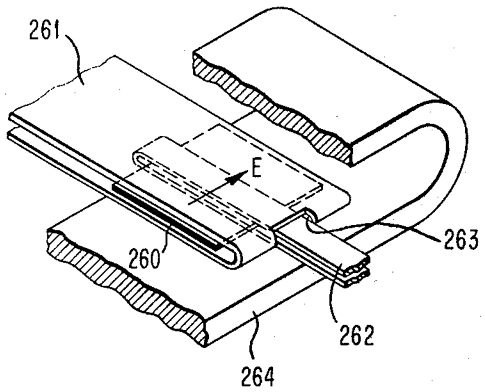
FIG. 13 illustrates another physical embodiment of this invention.

Another example of an embodiment of the bistable element is shown in FIG. 13. According to this example, a bistable element 260 is surrounded by a loop and ribbon shaped control winding 261. A detecting element 262 is also a loop and ribbon shaped conductor which is fed through a hole 263 provided in a folded edge of the control conductor 261. The detector or output conductor 262 has a folded edge on the left hand side of the element 260 and is disposed intermediate the magnetic element 260 and the control conductor 261. Surrounding the above described arrangement is a driving means formed by a conductive sheet 264. The current through the driving means 264 is supplied externally and, therefore, can be chosen to have a predetermined value and therefore, the driving loop 264 does not need to be as close to the element 260 as are the output and control windings 262 and 261, respectively. The latter windings sense and provide, respectively, small signals and may again be evaporated or electroplated upon the bistable element or its support 260, to keep the distances between these parts at a minimum and thus the efficiency at a maximum. Proper electrical insulation has to be provided between the above mentioned parts. It is easily seen that the field produced by the control conductor 261 and the field detected by the detecting conductor 262 are in the direction which is perpendicular to the direction in which these conductors extend, so that the "easy" direction of the bistable element is as indicated by an arrow again designated E.

Figure 14:
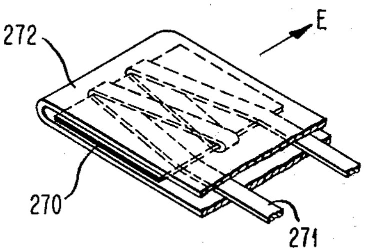
FIG. 14 illustrates still another physical embodiment of this invention.

FIG. 14 illustrates an embodiment wherein a bistable element 270 is provided with a ribbon shaped detecting conductor 271 which has a plurality of turns. The detecting conductor 271 has two turns which enclose the bistable element 270. Surrounding these parts is a control conductor 272 in the shape of a conductive sheet, that forms a loop. Due to the fact that the lead in to the detecting and control means 271 and 272, respectively, are on the same side of the bistable element 270, a hole as indicated by reference numeral 263 in FIG. 13 is not provided. The "easy" direction is again indicated by an arrow designated by the letter E. A driving means is not shown in this figure.

While there have been shown and described and pointed out, the fundamental novel features of the invention as applied to preferred embodiments, it will be understood that various omissions, substitutions and changes in the form and details of the devices illustrated and in their operation may be made by those skilled in the art, without departing from the spirit of the invention. It is the intention, therefore, to be limited only as indicated by the scope of the following claims.

What is claimed is:

1. In an information handling circuit, a first, a second and a third magnetic element, each said element having a plurality of magnetic moments and exhibiting an easy axis of magnetization along which the moments thereof tend to align themselves defining opposite stable states of remanent flux orientation adapted to represent said information, and in quadrature thereto a hard direction of magnetization, circuit means intercoupling said elements, and means for transferring the information retained in said first element to said second element in a first time interval and thence from said second element to the third element during a second time interval comprising, means coincidentally applying a field to both said first and second element during the first interval of time and coincidentally to said second and third element during said second interval of time for rotating the magnetization of said elements toward their respective hard directions upon application of said fields, said last means including means for both sequentially terminating the fields applied to said first and second elements during said first interval of time and sequentially terminating the fields applied to said second and third elements during said second interval of time whereby the information stored in said first element is sequentially transferred to said second and third elements via said circuit means.

2. The circuit of claim 1, wherein said second means includes an input and an output winding in each element wherein said windings have an unequal number of turns.

3. The circuit of claim 1, including means for applying a further field of predetermined magnitude directed transverse with respect to the easy axis of said first element intermediate said first and second time intervals to cause substantially half of the moments thereof to assume one of said stable states and the remaining moments to assume the other stable state.

4. The circuit of claim 1, including means for applying a further field of predetermined magnitude directed transverse with respect to the easy axis of said first element during said second time interval to rotate the magnetization thereof into the hard direction and establish substantially half the moments in one of said stable states and the remaining moments in the other stable state.

5. The circuit of claim 1, wherein the fields applied to said elements are alternating fields.

6. In an information handling circuit, a first and a second magnetic element each having a plurality of magnetic moments and each exhibiting an easy axis of magnetization along which the moments thereof tend to align themselves defining a first and a second stable state of remanent flux orientation adapted to represent said information and in quadrature thereto a hard direction of magnetization, circuit means intercoupling said elements, and means for coincidentally applying a field to rotate the magnetization of both said elements toward their hard directions and for thereafter relaxing the field applied to said first element to cause the information retained in said first element to be transferred through said circuit means to said second element whereupon the field applied to said second element is relaxed.

7. The circuit of claim 6, wherein the field applied to said second element overlaps the field applied to said first element in time.

8. In an information handling circuit, a plurality of magnetic thin film elements each having a plurality of magnetic moments and each exhibiting an easy axis of magnetization along which the magnetic moments thereof tend to align themselves defining a first and a second stable direction of remanent flux orientation adapted to represent said information, circuit means intercoupling said plurality of elements, and means for transferring the information retained in a first of said elements to a second of said elements comprising means for rotating the moments of both said first and second elements toward a direction transverse with respect to the easy direction of said first and second elements and thereafter allowing the moments of both said elements to relax sequentially.

9. In a circuit, a magnetic element exhibiting an easy axis of magnetization defining a first and a second stable direction of remanent flux orientation, winding means coupled to said element, means for applying a signal to one winding of said winding means to read out said element and establish said element in a neutralized magnetic state.

10. In a circuit, a magnetic element having a plurality of magnetic moments and exhibiting an easy axis of magnetization along which said moments tend to align themselves to define a first and a second stable direction of remanent flux orientation, winding means coupled to said element, and means including one winding of said winding means for applying a field transverse to the easy axis of said element for interrogating the stable state thereof and for causing substantially half of the moments to be oriented in said first stable direction and the remaining to be oriented in said second stable direction.

11. In a circuit comprising a first and a second magnetic thin film element each having a plurality of magnetic moments and exhibiting an easy axis of magnetization along which said moments tend to align themselves defining bistable states of remanent flux orientation, a method of conveying the stable state of said first element to the second element comprising the steps of rotating the moments of said second element toward a direction transverse to the easy axis of said second element, applying a force to the moments of said second element parallel to the easy axis thereof and in a direction determined by the state of said first element so that there is an overlapping in time in the occurrence of the applied force and the rotation of the moments of said second element.

12. In an information handling circuit comprising a first, and a second magnetic element, each element made of magnetic material exhibiting a neutralized stable state of substantially zero flux intermediate opposite stable states of remanent flux density, each said element exhibiting an easy axis of magnetization defining opposite orientation directions for the opposite stable states employed to represent said information and in quadrature thereto a hard direction of magnetization, circuit means intercoupling said elements, and means for transferring the binary information retained in said first element to said second element via said circuit means, comprising, means for applying fields of varying magnitude and duration in predetermined time sequence along the hard direction of said elements, said last means operative to coincidentally apply said fields to said first and second element during a first interval of time for initially rotating the magnetization of said second element slowly toward the hard direction and thereafter simultaneously rotating the magnetization of said first element toward the hard direction thereof while aligning the magnetization of said second element in the hard direction and thereafter, during a second period of time, applying said fields to said first element only for establishing said first element in the neutralized stable state, said last means including means for sequentially terminating the fields applied to said first and second element during said first interval of time in the order named.

13. In a circuit comprising a magnetic element made of material exhibiting a substantially rectangular hysteresis loop defining opposite limiting stable states of remanent flux density and intermediate thereto a neutralized stable state of zero flux density, said element exhibiting a uniaxial anisotropic characteristic defining different directions of flux orientation for the opposite limiting stable states of said element, a plurality of windings coupling said element, and means including said plurality of windings for establishing said element in a selective one of said opposite and neutralized stable states.

14. The circuit as set forth in claim 13 wherein said element comprises a plane substrate member of electrically nonconductive, nonmagnetizable material having a thin film deposit of ferromagnetic material thereon with the ferromagnetic material of said element defining a portion of a flux path only.

References Cited

UNITED STATES PATENTS 3,054,094 9/1962 Stuckert ............ 340—174

OTHER REFERENCES

Pages 55–57, June 5, 1959—"Using Thin Films in High-Speed Memories," Eric E. Bittmann—Electronics.

Pages 60S and 61S, April 1959—"Operating Characteristics of a Thin Memory," Jack I. Raffel—Journal of Applied Physics Supplement to vol. 30, No. 4.

Pages 1752–4, June 15, 1955, "Magnetization Reversal in Thin Films," R. I. Conger—Physical Review.

BERNARD KONICK, *Primary Examiner.*

EVERETT R. REYNOLDS, IRVING L. SRAGOW, *Examiners.*

J. W. MOFFITT, J. P. SCHERLACHER, M. S. GITTES, *Assistant Examiners.*